United States Patent [19]
Goodman

[11] Patent Number: 5,750,265
[45] Date of Patent: May 12, 1998

[54] COATED GLASS ARTICLE HAVING A PYROLYTIC SOLAR CONTROL COATING

[75] Inventor: Ronald D. Goodman, Toledo, Ohio

[73] Assignee: Libbey-Owens-Ford Co., Toledo, Ohio

[21] Appl. No.: 585,106

[22] Filed: Jan. 11, 1996

[51] Int. Cl.⁶ .................................................. B32B 17/06
[52] U.S. Cl. .......................... 428/432; 428/220; 428/448; 428/699; 428/701; 428/702; 359/359; 359/361; 359/586; 359/589
[58] Field of Search ........................... 359/359, 361, 359/586, 589; 428/220, 432, 448, 699, 701, 702

[56] References Cited

U.S. PATENT DOCUMENTS

| | | | |
|---|---|---|---|
| 4,377,613 | 3/1983 | Gordon | 359/586 |
| 4,440,822 | 4/1984 | Gordon | 359/586 |
| 4,896,928 | 1/1990 | Perilloux | 359/589 |
| 4,968,563 | 11/1990 | Thomas | 428/432 |
| 4,971,843 | 11/1990 | Michelotti | 359/589 |
| 5,168,003 | 12/1992 | Proscia | 359/586 |
| 5,332,618 | 7/1994 | Austin | 428/432 |
| 5,395,698 | 3/1995 | Neuman | 359/586 |

*Primary Examiner*—Timothy Speer
*Attorney, Agent, or Firm*—Marshall & Melhorn

[57] ABSTRACT

A glass article used for producing a coated, solar control glass for architectural windows. The coated article includes a glass substrate, a coating of titanium dioxide deposited on and adhering to the surface of the glass substrate, a coating of silicon dioxide deposited on and adhering to the surface of the coating of the titanium dioxide, a second coating of titanium dioxide deposited on and adhering to the surface of the coating of the silicon dioxide, and an outer coating of conductive tin oxide deposited on and adhering to the surface of the coating of titanium dioxide. A specific coating stack on the glass substrate provides a neutral colored article having a high visible light transmittance, a reduced solar energy transmittance, a low emittance, and a high total solar reflectance. The use of the article in architectural glazings results in a glazing that reflects solar energy in the summer and provides a low U value for the winter.

33 Claims, 1 Drawing Sheet

COATED GLASS ARTICLE HAVING A PYROLYTIC SOLAR CONTROL COATING

BACKGROUND OF THE INVENTION

1. Field of the Invention

This invention relates to a coated glass article having a pyrolytic solar control coating. More particularly, this invention relates to a coating stack of titanium dioxide, silicon oxide, titanium dioxide, and conductive tin oxide on a glass substrate that results in an article having a color neutral reflectance, a low emittance, a low solar energy transmittance, a high total solar reflectance, and a high visible light transmittance.

2. Summary of Related Art

Coatings on architectural glass are commonly utilized to provide specific energy absorption and light transmittance properties. Additionally, coatings provide desired reflective or spectral properties that are aesthetically pleasing. The coated articles are often used singularly or in combination with other coated articles to form a glazing or window unit.

Coated glass articles are typically produced by continuously coating a glass substrate while it is being manufactured in a process known in the art as the "float glass process". This process involves casting glass onto a molten tin bath which is suitably enclosed, thereafter transferring the glass, after it is sufficiently cooled, to lift out rolls which are aligned with the bath, and finally cooling the glass as it advances across the rolls, initially through a lehr and thereafter while exposed to the ambient atmosphere. A non-oxidizing atmosphere is maintained in the float portion of the process, while the glass is in contact with the molten tin bath, to prevent oxidation. An oxidizing atmosphere is maintained in the lehr. In general, the coatings are applied onto the glass substrate in the float bath of the float bath process. However, coatings may also be applied onto the substrate in the lehr.

The attributes of the resulting coated glass substrate are dependent upon the specific coatings applied during the float glass process. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

It would be advantageous to provide a coated glass article having a neutral tint that rejects solar energy in the summer and provides a low U value for the winter. The pyrolytic solar reducing glazing with a low emittance, a low solar energy transmittance, and a high total solar reflection would significantly improve energy costs in buildings and homes while providing a desirable neutral tint.

It would also be advantageous to provide the pyrolytic solar reducing glazing that has a color neutral reflectance, a low emittance, a high visible light transmittance, a low total solar energy transmittance, and a high total solar reflection. The use of a neutral colored article in architectural glazings would permit the transmission of a high degree of visible light while reflecting a significant amount of near infrared energy. Furthermore, the low emittance characteristic of the glazing would minimize any indirect heat gain from absorption.

SUMMARY OF THE INVENTION

In accordance with the present invention, there is provided a novel glass article useful for producing coated, heat reducing glass for architectural windows. The coated article includes a glass substrate, a coating of titanium dioxide deposited on and adhering to the surface of the glass substrate, a coating of silicon dioxide deposited on and adhering to the surface of the coating of titanium dioxide, a second coating of titanium dioxide deposited on and adhering to the surface of the coating of the silicon dioxide, and an outer coating of a conductive tin oxide deposited on and adhering to the surface of the coating of titanium dioxide. The use of the present inventive article in architectural glazings results in a glazing that rejects solar energy in the summer and a provides a low U value for the winter.

The specific coating stack on the glass substrate provides a neutral colored article having a high visible light transmittance, a reduced total solar energy transmittance, a low emittance, and a high total solar reflectance.

The first three layers of the coating stack on the glass substrate provide a high visible light transmittance while reflecting a high amount of near infrared energy. The layers are a combination of low and high index quarter wave layers with a design wavelength in the near infrared region. The low visible light reflectance results in a visible light transmittance (Illuminant C) greater than 65%. The high degree of reflection in the near infrared region provides a solar heat transmittance of less than 50%.

The outer conductive tin oxide layer reduces the emittance of the glass article to less than 0.2. The low emittance value minimizes the indirect gain from absorption and provides a U value of less than 0.4.

It is an object of the present invention to provide a neutral colored architectural glazing that transmits a high degree of visible light and reflects a significant amount of near infrared energy. The present invention utilizes a near infrared reflecting stack having high and low index quarter wave layers with a design wavelength in the near infrared region. Furthermore, the present invention minimizes the number of layers in the stack while maximizing the near infrared energy reflectance by differing the index of the high and low index layers as much as possible.

It is a further object of the present invention to provide an architectural glazing having a low emittance to minimize the indirect gain from absorption. The conductive tin oxide layer of the present invention lowers the overall emittance of the glazing and thereby provides a low U value.

It is also an object of the present invention to provide a coated glass article suitable for use as an architectural glazing having a neutral color in both reflectance and transmittance while maintaining the desired emittance and solar energy transmittance properties. The coating stacks of the present invention are specifically applied at thicknesses which result in the desired reflected and transmitted neutral color.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE DRAWINGS

Figure 1:
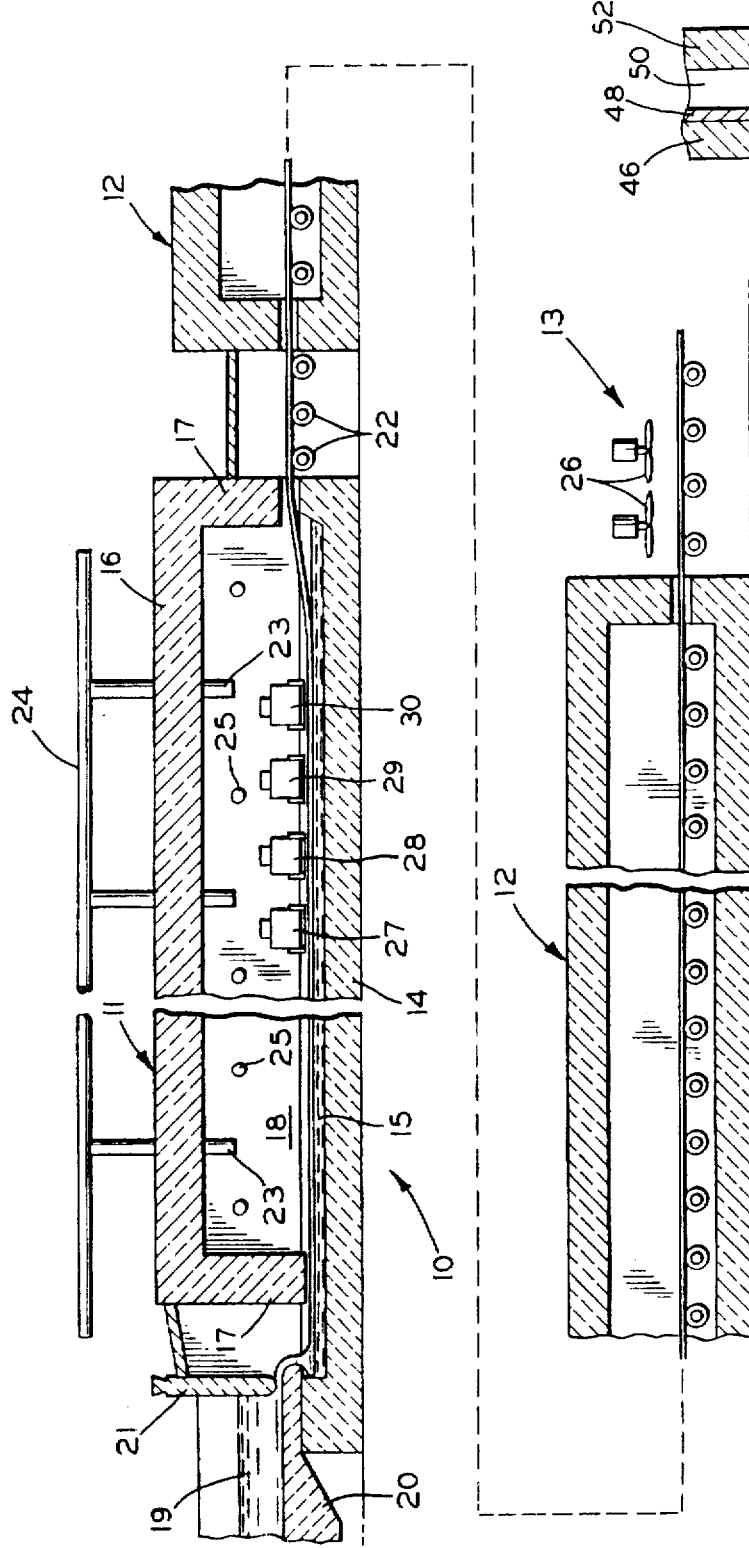
FIG. 1 is a schematic view, in vertical section, of an apparatus for practicing the float glass process, which includes four gas distributors suitably positioned in the float bath to apply coatings onto the glass substrate in accordance with the present invention.

Referring now more particularly to the drawings, there is illustrated in FIG. 1, an apparatus, indicated generally at 10, useful for producing the coated glass article of the present invention, comprising a float section 11, a lehr 12, and a cooling section 13. The float section 11 has a bottom 14 which contains a molten tin bath 15, a roof 16, sidewalls (not shown), and end walls 17, which together form a seal such that there is provided an enclosed zone 18, wherein a non-oxidizing atmosphere is maintained, as hereinafter described in greater detail, to prevent oxidation of the tin bath 15. During operation of the apparatus 10, molten glass 19 is cast onto a hearth 20, and flows therefrom under a metering wall 21, then downwardly onto the surface of the tin bath 15, from which it is removed by lift-out rolls 22 and conveyed through the lehr 12, and thereafter through the cooling section 13.

A non-oxidizing atmosphere is maintained in the float section 11 by introducing a suitable gas, such as for example one composed of 99 percent by volume nitrogen and 1 percent by volume hydrogen, into the zone 18, through conduits 23 which are operably connected to a manifold 24. The non-oxidizing gas is introduced into the zone 18 from the conduits 23 at a rate sufficient to compensate for losses of the gas (some of the non-oxidizing atmosphere leaves the zone 18 by flowing under the end walls 17), and to maintain a slight positive pressure, conveniently about 0.001 to about 0.01 atmosphere above ambient pressure. The tin bath 15 and the enclosed zone 18 are heated by radiant heat directed downwardly from heaters 25. The heat zone 18 is generally maintained at a temperature of about 1200° F. The atmosphere in the lehr 12 is typically air, and the cooling section 13 is not enclosed. Ambient air is blown onto the glass by fans 26. The apparatus 10 also includes gas distributors 27,28,29 and 30 located in the float zone 11.

Figure 2:
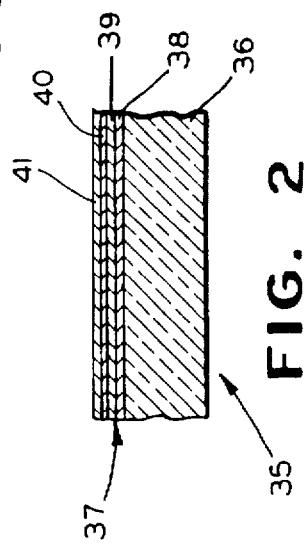
FIG. 2 is a broken sectional view of a coated glass article, according to the present invention.

FIG. 2 illustrates the coated glass article of the present invention, indicated generally at 35, comprising a glass substrate 36, and a multilayered coating 37 adhered to one surface thereof. The multilayered coating comprises a coating of titanium dioxide 38, a coating of a silicon dioxide 39, a second coating of titanium dioxide 40, and an outer coating of a conductive tin oxide 41.

Figure 3:
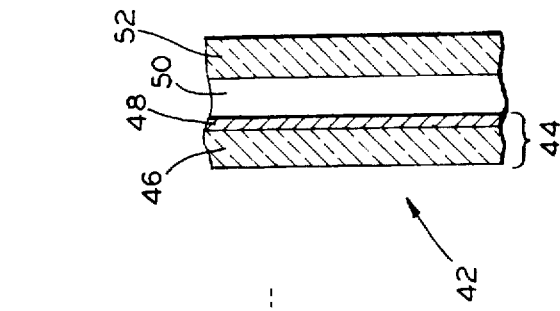
FIG. 3 is a diagram of an architectural glazing in accordance with the present invention, wherein the coated glass article is shown in an insulated glass unit as an outboard lite with the multilayer coating of the present invention facing the interior.

The coated glass article of the present invention is further illustrated in FIG. 3 as an outboard lite 44 in an insulated glass unit 42 suitable for installation into a building structure. The insulated glass unit 42 also includes an inboard lite 52 made of a clear glass article. The glass substrate 46 of the present invention is positioned facing the exterior of the structure. The multilayered coating 48 of the present invention faces the interior with an air space 50 separating the outboard lite 44 from the inboard lite 52.

DETAILED DESCRIPTION OF THE PREFERRED EMBODIMENT

In accordance with the present invention, it has surprisingly been discovered that a coated glass article having a multilayered coating of titanium dioxide, silicon dioxide, a second layer of titanium dioxide, and an outer coating of conductive tin oxide provides a neutral colored article which exhibits a low emittance, a high visible light transmittance, a reduced solar energy transmittance, and a high total solar reflectance. The coated glass article is especially suitable for use in architectural glazings and windows. However, the coated glass article of the present invention may also be suitable for other applications, such as vehicle windows.

The glass substrates suitable for use in preparing the coated glass article according to the present invention may include any of the conventional clear glass compositions known in the art as useful for the preparation of architectural glazings. The preferred substrate is a clear float glass ribbon wherein the coatings of the present invention are applied in the heated zone of the float glass process.

The first three coating layers in the multilayer stack of the present invention are designed to reflect a significant amount of near infrared energy above 700 nm while transmitting a high degree of visible light below 700 nm. The attenuation of the near infrared energy reduces the solar energy transmittance of the coated article.

The reflection of the near infrared energy is accomplished through the use of high and low index quarter wave layers with a design wavelength in the near infrared region. A greater differential between the high and low index layers increases the width of the reflection zone in the near infrared region and thereby reduces the number of layers required in the coating stack. In the present invention, a titanium dioxide coating, having an index of about 2.4, is utilized in conjunction with the silicon dioxide coating having an index of about 1.46.

The first titanium dioxide coating of the present invention is suitably prepared and applied onto the glass substrate by any of the conventional methods generally known in the art. For example, the titanium dioxide coating may be deposited onto the glass substrate through a chemical vapor deposition process, wherein an isopropoxide titanium source thermally decomposes in excess oxygen to deposit titanium dioxide onto the float glass ribbon. Other methods of depositing titanium dioxide are suitable for use with the present invention. This includes the use of a titanium tetrahalide and an oxidizing agent reacted at or near the surface of the float glass ribbon.

In accordance with the present coated article, a silicon dioxide coating is deposited on and adheres to the surface of the first titanium dioxide coating. Silicon dioxide coatings suitable for use with the present invention may be prepared by conventional processes known in the art. The silicon dioxide coating may be deposited onto the titanium dioxide coating by introducing an organometallic silicon source, in an oxidizing atmosphere, at or near the titanium dioxide surface. For example, a dichlorosilane, in the presence of oxygen, will react to form the desired silicon dioxide coating. Other methods of applying silicon dioxide coatings onto a substrate are suitable for practicing the present invention.

A second titanium dioxide coating is applied over the silicon dioxide coating to complete the high and low index stack of the present invention. The titanium dioxide coating is applied onto the substrate by the conventional methods previously described.

The outer coating of the multilayer stack is deposited on and adheres to the second titanium dioxide coating. The outer coating is a conductive tin oxide coating which results in a low emittance film. The low emittance of the coating minimizes the indirect gain from absorption for summer use and also produces a coated article having a low U value for winter use. The low emittance coating limits the transmission of radiant heat from the glass caused by the absorption of radiation. The conductive tin oxide coating is applied as a relatively thick coating in comparison to the other coatings of the multilayer stack. The thickness of the coating is required to improve the conductivity and thereby improve the emittance properties.

According to the present invention, the conductive tin oxide coating of the multilayer stack is preferably a fluorine doped tin oxide. However, other conductive tin oxides which result in a low emittance coating may be used in accordance with the present invention. The fluorine doped tin oxide may be prepared by any of the conventional methods generally known in the art. For example, the coating may be applied through a chemical vapor deposition method wherein an organometallic tin source, such as dimethyltin dichloride, and a dopant, such as hydrofluoric acid, are reacted in the presence of water and oxygen to form the conductive fluorine doped tin oxide coating.

The coated glass article of the present invention may include a glass substrate of any thickness which may be practiced in accordance with the float glass process. However, the preferred glass substrate is 0.125 inch clear glass. The first titanium dioxide coating of the present invention is about 845 to about 940 Angstroms thick; preferably about 874 to about 910 Angstroms thick; and most preferably about 892 Angstroms thick. The silicon dioxide coating is about 1330 to about 1470 Angstroms thick; preferably about 1372 to about 1428 Angstroms thick; and most preferably about 1400 Angstroms thick. The second titanium dioxide coating of the present multilayered stack is about 815 to about 900 Angstroms thick; preferably about 839 to about 874 Angstroms thick; thick; preferably about 839 to about 874 Angstroms thick; and most preferably about 857 Angstroms thick. The outer conductive tin oxide layer is about 2090 to about 2310 Angstroms thick; preferably about 2156 to about 2244 Angstroms thick; and most preferably about 2200 Angstroms thick.

The multilayered coatings of the present invention result in a coated glass article exhibiting neutral color in both reflectance and transmittance. The color is defined by the composition and thickness of the stack. The reflective color, measured from the glass substrate side of the coated article and defined on the CIELAB color scale system, has an a* value of about 1 to about $-6$ and a b* value of about 3 to about $-5$. The preferred value of a* is about $-0.1$ and the preferred value of b* is about $-2.3$. The transmitted color of the coated article is aesthetically neutral. The color purity of the article, as defined by the square root of $a^{*2}+b^{*2}$, is less than 7.

The resulting neutral colored article of the present invention exhibits a low emittance, a high visible light transmittance, a low solar energy transmittance and a high total solar reflectance. The emittance of the present inventive article is less than 0.2. The reflection of the near infrared energy results in a solar heat transmittance of less than 50%. The article of the present invention also exhibits a visible light transmittance (Illuminant C) greater than 65% and preferably greater than 70%. Additionally, the low solar heat transmittance of the coated glass article results in a shading coefficient no greater than 0.65.

The coated glass article is ideally suited for use in architectural glazings. For example, the coated glass article may be utilized in an insulated glass unit wherein the article of the present invention functions as an outboard lite with a second clear glass article used as an inboard lite. An insulated glass unit is depicted in FIG.3.

The insulated glass unit minimizes the heat transfer from the absorbing lite or clear glass substrate into the interior of the structure. The indirect gain, or the transmission of the absorbed radiation, is minimized by placing the low emittance coating of the present inventive article towards the interior of the structure. The low emittance glass reflects or redirects the radiant heat generated from a warm object back toward the source. Additionally, the glass substrate faces the exterior which enables exterior convection to minimize heat flow. The combination of the low emittance and near infrared reflecting properties of the present invention result in an insulated glass unit which rejects solar heat in the summer and exhibits a low U value in the winter.

The resulting insulated glass unit, utilizing the coated glass article of the present invention, exhibits specific transmittance and spectral properties. The insulated glass unit has an effective emittance value of less than 0.2. The low emittance value corresponds to a U value of less than 0.4 and preferably less than 0.35. The solar heat transmittance of the unit is less than 50%. The insulated glass unit also exhibits a visible light transmittance (Illuminant C) greater than 65% and preferably greater than 70%. The shading co-efficient of the unit is no greater than 0.6.

The insulated glass unit exhibits a neutral color in both reflectance and transmittance. The reflective color, as defined on the CIELAB color scale system, has an a* value of about 0 to about $-6$ and a b* value of about 3 to about $-3$. The preferred value of a* is about $-1.4$ and the preferred value of b* is about $-0.2$. The transmittance color of the coated article is aesthetically neutral and the color purity is less than 7.

The following example, which constitutes the best mode presently contemplated by the inventor for practicing the present invention, is presented solely for the purpose of further illustrating and disclosing the present invention, and is not to be construed as a limitation on, the invention:

PREDICTIVE EXAMPLE

A float glass process is used to produce a float glass ribbon having a thickness of 0.125 inches. During the production of the float glass ribbon, four coatings are consecutively applied onto the glass substrate in the float bath through conventional chemical vapor deposition methods. A first coating of titanium dioxide is applied onto and adheres to the surface of the glass substrate at a thickness of about 892 Angstroms. A coating of silicon dioxide of about 1400 Angstroms is then deposited onto the surface of the titanium dioxide coating. A second coating of titanium dioxide of about 857 Angstroms thick is deposited onto the surface of the silicon dioxide. A final outer coating of a fluorine doped tin oxide of about 2200 Angstroms thick is deposited onto the surface of the second titanium dioxide coating.

The coated article is conveyed through the entire float glass process as previously described. The coated article is then is cut and sized for placement as an outboard lite in an insulated glass unit.

The insulated glass unit, utilizing the coated glass article as an outboard lite with the multilayered stack of the present invention facing the interior of the structure, would exhibit the beneficial color, emittance, and transmittance properties of the present invention. The insulated glass unit would have a aesthetically neutral transmitted color. The reflective color, as defined in the CIELAB color system, would have an a* value of about $-1.4$ and a b* value of about $-0.2$. The insulated glass unit would have an effective emittance, as measured between the interior facing surface of the coated article and the exterior facing surface of the clear glass article, of less than 0.2 and a U value of about 0.3. The shading coefficient would be 0.55 with a total solar heat transmittance of less than 50%. The visible light transmittance (Illuminant C) would be 72%.

In accordance with the provisions of the patent statutes, the present invention has been described in what is considered to represent its preferred embodiment. However, it should be noted that the invention can be practiced otherwise than as specifically illustrated and described without departing from its spirit and scope. For example, other coating methods, such as sputtering, may also be utilized to form the pyrolytic solar control coating of the present invention.

What is claimed is:

1. A coated glass article comprising:
   (A) a glass substrate, having a surface;
   (B) a first coating of titanium dioxide deposited on and adhering to the surface of the glass substrate;
   (C) a coating of silicon dioxide deposited on and adhering to the coating of titanium dioxide;
   (D) a second coating of titanium dioxide deposited on and adhering to the coating of silicon oxide; and
   (E) a coating of conductive tin oxide deposited on and adhering to said second coating of titanium dioxide, said coated glass article having a visible light transmittance (Illuminant C) of greater than 65%, a solar heat transmittance of less than 50%, and an emittance less than or equal to about 0.2.

2. The coated glass article of claim 1, wherein said glass substrate is a clear float glass ribbon.

3. The coated glass article of claim 1, wherein said conductive tin oxide is a fluorine doped tin oxide coating.

4. The coated glass article of claim 1, wherein said article exhibits a neutral color in reflectance as defined in the CIELAB system having an a* value from about 1 to about −6 and a b* value of about 3 to about −5.

5. The coated glass article of claim 1, wherein said article has a U value less than 0.4.

6. The coated glass article of claim 1, wherein said article has a color purity of less than 7.

7. The coated glass article of claim 1, wherein said first coating of titanium dioxide is about 845 to about 940 Angstroms thick.

8. The coated glass article of claim 1, wherein said coating of silicon dioxide is about 1330 to about 1470 Angstroms thick.

9. The coated glass article of claim 1, wherein said second coating of titanium dioxide is about 815 to about 900 Angstroms thick.

10. The coated glass article of claim 1, wherein said coating of conductive tin oxide is about 2090 to about 2310 Angstroms thick.

11. An insulated glass unit for architectural windows, comprising a coated glass article as defined in claim 1.

12. The insulated glass unit of claim 11, wherein said insulated glass unit has a reflected color as defined in the CIELAB system having an a* value from about 0 to about −6 and a b* value of about 3 to about −3.

13. A coated glass article comprising:
   (A) a glass substrate, having a surface;
   (B) a first coating of titanium dioxide deposited on and adhering to the surface of the glass substrate, said first coating of titanium dioxide having a thickness of about 845 to about 940 Angstroms;
   (C) a coating of silicon dioxide deposited on and adhering to the coating of titanium dioxide, said coating of silicon dioxide having a thickness of about 1330 to about 1470 Angstroms;
   (D) a second coating of titanium dioxide deposited on and adhering to the coating of silicon oxide, said second coating of titanium dioxide having a thickness of about 815 to about 900 Angstroms; and
   (E) a coating of fluorine doped tin oxide deposited on and adhering to said coating of titanium dioxide, said coating of fluorine doped tin oxide having a thickness of about 2090 to about 2310 Angstroms, said coated glass article having a visible light transmittance (Illuminant C) of greater than 65%, a solar heat transmittance of less than 50%, an emittance less than or equal to about 0.2, and a U value less than 0.4

14. The coated glass article of claim 13, wherein said glass substrate is a clear float glass ribbon.

15. The coated glass article of claim 13, wherein said article exhibits a neutral color in reflectance as defined in the CIELAB system having an a* value from about 1 to about −6 and a b* value of about 3 to about −5.

16. The coated glass article of claim 13, wherein said article has a color purity of less than 7.

17. The coated glass article of claim 13, wherein said first coating of titanium dioxide is about 874 to about 910 Angstroms thick.

18. The coated glass article of claim 17, wherein said first coating of titanium dioxide is about 892 Angstroms thick.

19. The coated glass article of claim 13, wherein said coating of silicon dioxide is about 1372 to about 1428 Angstroms thick.

20. The coated glass article of claim 19, wherein said coating of silicon dioxide is about 1400 Angstroms thick.

21. The coated glass article of claim 13, wherein said second coating of titanium dioxide is about 839 to about 874 Angstroms thick.

22. The coated glass article of claim 21, wherein said second coating of titanium dioxide is about 857 Angstroms thick.

23. The coated glass article of claim 13, wherein said coating of fluorine doped tin oxide is about 2156 to about 2244 Angstroms thick.

24. The coated glass article of claim 23, wherein said coating of fluorine doped tin oxide is about 2200 Angstroms thick.

25. An insulated glass unit for architectural windows, comprising a coated glass article as defined in claim 13.

26. The insulated glass unit of claim 25, wherein said insulated glass unit has a reflected color as defined in the CIELAB system having an a* value from about 0 to about −6 and a b* value of about 3 to about −3.

27. A coated glass article comprising:
   (A) a float glass ribbon, having a surface;
   (B) a first coating of titanium dioxide deposited on and adhering to the surface of the float glass ribbon, said first coating of titanium dioxide having a thickness of about 874 to about 910 Angstroms;
   (C) a coating of silicon dioxide deposited on and adhering to the coating of titanium dioxide, said coating of silicon dioxide having a thickness of is about 1372 to about 1428 Angstroms;
   (D) a second coating of titanium dioxide deposited on and adhering to the coating of silicon oxide, said second coating of titanium dioxide having a thickness of about 839 to about 874 Angstroms; and
   (E) a coating of fluorine doped tin oxide deposited on and adhering to said coating of titanium dioxide, said coating of fluorine doped tin oxide having a thickness of about 2156 to about 2244 Angstroms, said coated glass article having a visible light transmittance (Illuminant C) of greater than 65%, a solar heat transmittance of less than 50%, an emittance of 0.2, and a U value less than 0.4

28. The coated glass article of claim 27, wherein said article exhibits a neutral color in reflectance as defined in the CIELAB system having an a* value from about 1 to about −6 and a b* value of about 3 to about −5.

29. The coated glass article of claim 27, wherein said article has a color purity of less than 7.

30. The coated glass article of claim 27, wherein said first coating of titanium dioxide is about 892 Angstroms thick, said coating of silicon dioxide is about 1400 Angstroms thick, said second coating of titanium dioxide is about 857 Angstroms thick, and said coating of fluorine doped tin oxide is about 2200 Angstroms thick.

31. An insulated glass unit for architectural windows, comprising a coated glass article as defined in claim 27.

32. The insulated glass unit of claim 31, wherein said insulated glass unit has a reflected color as defined in the CIELAB system having an a* value of about −1.4 and a b* value of about −0.2.

33. A coated glass article consisting essentially of:
(A) a glass substrate, having a surface;
(B) a first coating of titanium dioxide deposited on and adhering to the surface of the glass substrate;
(C) a coating of silicon dioxide deposited on and adhering to the coating of titanium dioxide;
(D) a second coating of titanium dioxide deposited on and adhering to the coating of silicon oxide; and
(E) a coating of conductive tin oxide deposited on and adhering to said second coating of titanium dioxide, said coated glass article having a visible light transmittance (Illuminant C) of greater than 65%, a solar heat transmittance of less than 50%, and an emittance less than or equal to about 0.2.

* * * * *